Inventor:
KARL-HEINZ HONSEL

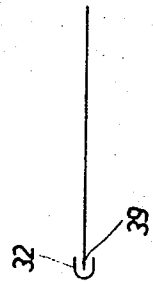
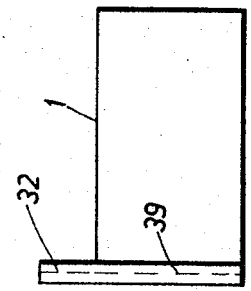
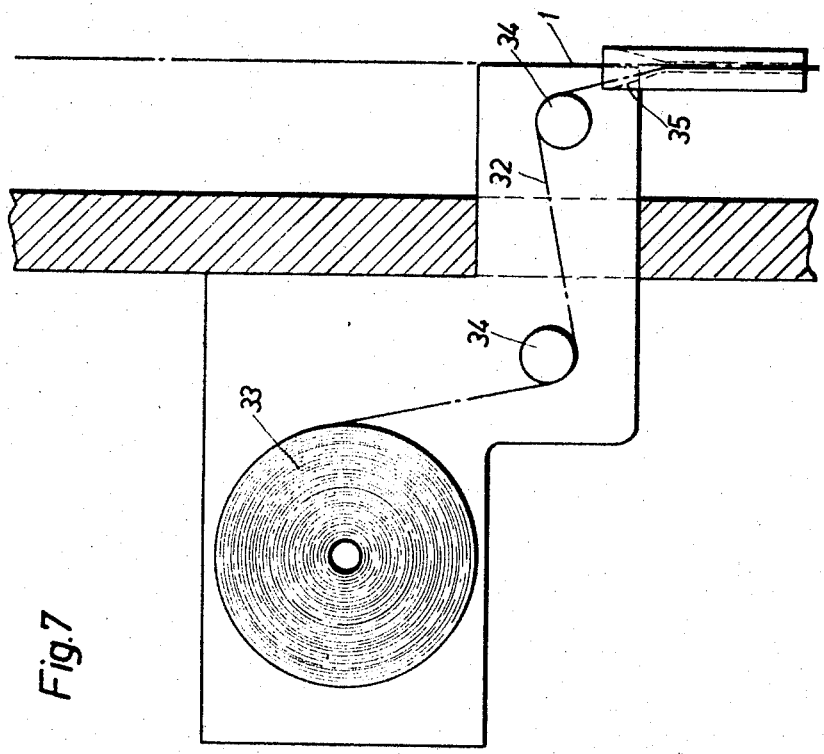

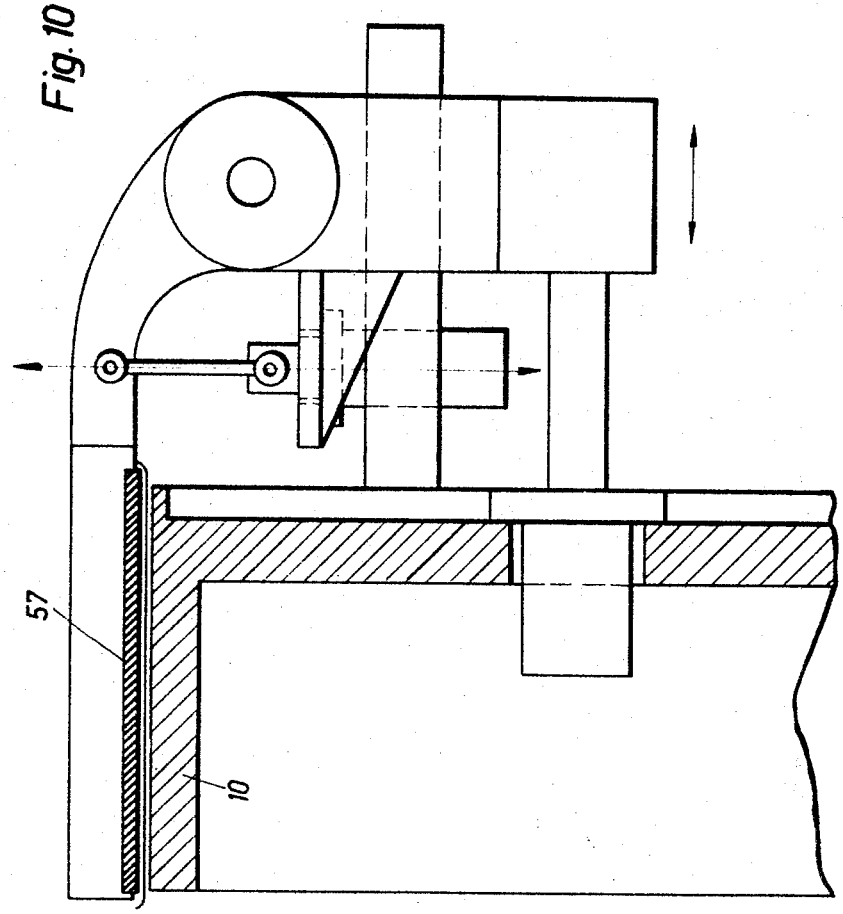

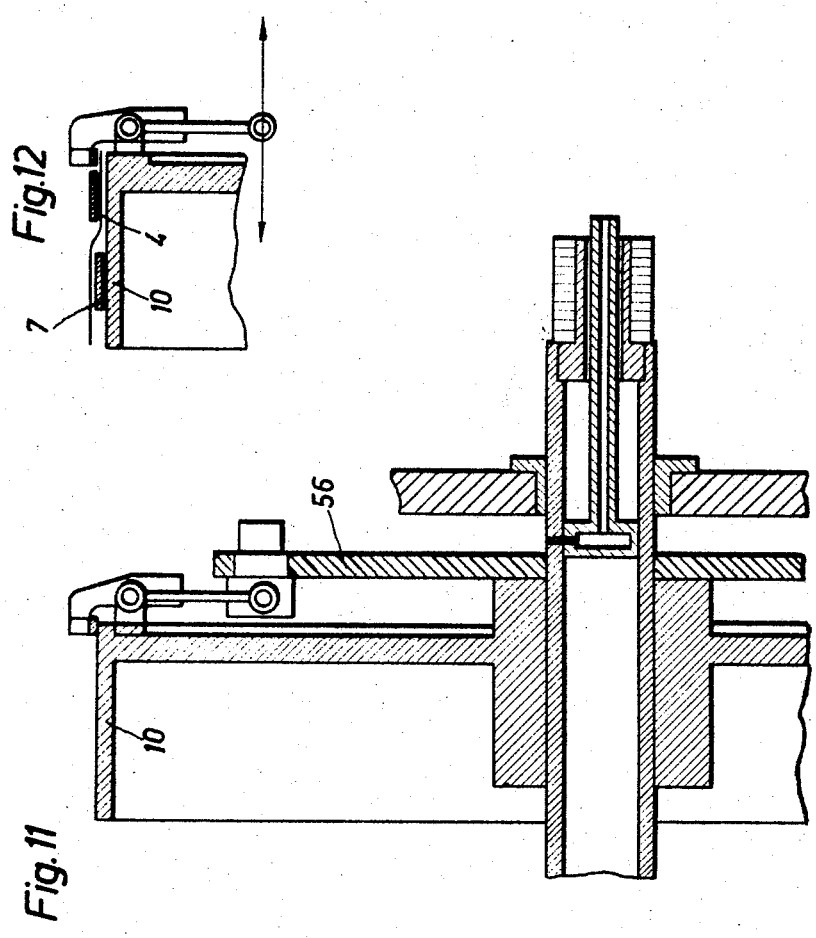

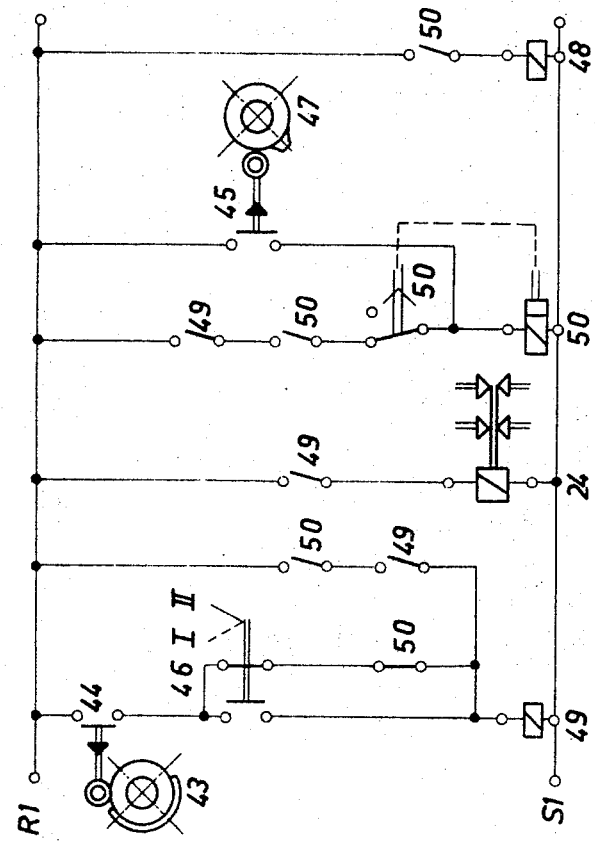
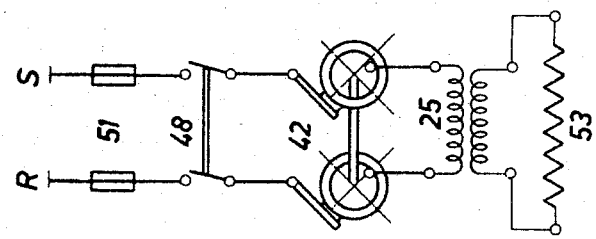

United States Patent Office 3,461,019
Patented Aug. 12, 1969

3,461,019
METHOD FOR WELDING ONE OR BOTH ENDS OF TUBE SECTIONS OF PLASTIC MATERIAL
Karl-Heinz Honsel, Herforder Strasse 285, Bielefeld, Germany
Filed July 14, 1965, Ser. No. 471,809
Int. Cl. B32b 31/20
U.S. Cl. 156—464        12 Claims

ABSTRACT OF THE DISCLOSURE

The disclosure concerns a manner of sealing tubular blanks made primarily of plastic material to produce bags which are sealed at one or both ends, where the blanks are placed transversely across a rotatable drum which has sealing stations that extend circumferentially of the drum to seal the ends of the blanks, which ends extend parallel to the sealing strips or bars.

BACKGROUND OF THE INVENTION

The present invention relates to the art of making bags of plastic material from sections of material cut from elongated tubes of plastic material.

Considerable efforts are directed at present towards producing bags or sacks from plastic material, primarily crossed bottom bags or cossed bottom bags with pouring spouts, of the type made heretofore in single or multi-layers from paper. If such plastic bags are now on the market only in relatively small quantities, this is due to the fact that the working of plastic material for such purposes is not sufficiently economical or cannot be effected to insure of welded seams that are sufficiently sealed.

The welding of one or both ends of an elastic tube section was effected heretofore in a manner that the blank was welded while stationary, i.e. the welding machines used for this purpose operated discontinuously, which was made necessary because the welding time for producing a seam, especially when working with foil of considerable thickness, is relatively long. It can be seen that the use of welding machines operating discontinuously or interruptedly is uneconomical as compared to continuously operating machines of high output used in the production of paper bags or sacks.

In recognition of these circumstances it has already been proposed to weld plastic foil for producing bags by continuous rotation methods using a rotatable drum having a plurality of welding stations arranged circumferentially thereof. Such a welding drum is continuously supplied with a plastic tube. With this machine it is only possible to produce transverse welding seams with the welding bars disposed parallel to the axis of the drum and this only by using the impulse welding method. In order to obtain longer welding periods inwardly directed recesses are provided circumferentially of the drum between adjacent welding bars into which the web of plastic tubing is placed by means of an additional tucking device and is to be held in position against the base of the recessed chambers by suction air. Thus the plastic bags to be produced are made on the drum in the longitudinal direction of the plastic web and the plastic web is provided with transverse weld seams at predetermined distances. However, since the length of such a bag is generally greater than its width, it is necessary in order to adhere to the required welding time to have a drum of particularly large diameter. Then, only after passing over the entire circumference of the drum the separation of the individual workpieces from the plastic web is effected. During this course of rotation the entire plastic web with its transverse welding seam is under a certain tension which makes it impossible to apply shrunk welding seams. Owing to the operation of the additional tucking device displacement can occur in the directioin longitudinally of the web of tubing which can make it impossible that the cutting of the individual workpieces or blanks takes place accurately alongside of each welding seam after rotation with the drum. This can result in a relatively large amount of rejects. Moreover a welding machine of this type is also subject to break downs or interruption due to the welding bars being movably arranged on a rotating chain.

SUMMARY OF THE INVENTION

It is, therefore, an object of the invention to provide a method and apparatus that permits of the production of plastic bags continuously and alone for that reason economically while the shortcomings of the continuously operating welding machine described above are largely avoided. All type of welding seams are to be obtainable. High output is to be achieved.

Accordingly the invention provides in the first place that the individual tube sections are fed separately from one another and transversely to the welding drum and that after effecting the welding the tube sections are fed directly to a depositing device of a type known per se. Owing to the transverse position of the tubing sections on the wall surface of the welding drum it is possible to accommodate a larger number of sections on the wall of the drum. This means that alone this feature makes available a longer welding time. Since each section of tubing is located during the welding operation individually around the circumference of the drum without being connected to adjacent tubing sections, any desired manner of welding can be employed as, for example, shrink welding which as compared to impulse welding frequently insures of a tighter or denser welding seam. Due to the numerous welding stations around the circumference of the welding drum it is naturally possible to attain long welding periods together with high output.

By feeding the individual sections of tubing separately and transversely to the welding drum, the possibility is afforded of feeding to the transversely disposed section of tubing to that of its end which is to be welded, a plastic strip which is V- or U-shaped in cross section and which encompasses this end before this section of tubing arrives at its welding station. In this manner it becomes possible without additional expenditure of time that the section of tubing is provided at one end or both ends with what is called a lap or flat seam. In this connection one can proceed in a manner that the plastic strip in endless form is supplied to the transversely fed tubing sections and that only immediately before the placing of the tubing sections the plastic strip is severed at the longitudinal edges of the tubing sections.

In order to carry out the method in accordance with the invention it is first necessary to provide retaining devices around the circumference of the rotating drum which secure the welding position of the tubing sections which are disposed transversely and at a distance from one another. A lower and upper band arrangement can serve as the common holding device of all tubing sections provided circumferentially of the drum.

A particularly suitable arrangement for carrying out the method in accordance with the invention is that both welding elements of each welding station are provided together with the control device for the movable welding element on the wall surface or on an end surface of the welding drum. In this connection the control element for the movable welding element may consist of a cylinder piston arrangement operating pneumatically or hydraulically under control of a magnetic valve. It is also possible that the control elements for the movable welding elements are provided on an additional carrier disk rotating with the welding drum.

This fundamental construction of the welding machine in accordance with the invention also makes it possible to provide in a known manner upon the wall surface of the welding drum in addition to the welding elements circumferentially of the drum further welding elements disposed parallel to the axis of the drum. With the tubing sections disposed transversely in accordance with the invention on the wall of the rotating drum it is apparent that the welding elements for the transverse welds at the ends of the tubing sections must be arcuately shaped. Now if the possibility exists with these arcuately shaped welding elements, which have to weld the ends of the tubing sections to provide additional welding elements which are arranged parallel to the axis of the drum, then the feasibility is established of making on this machine not only such bags which have transverse welds at their ends, thus providing a pillow shape when the bag is filled, but this cooperation of transverse and longitudinal welds upon the wall surface of the rotating drum now afford also the possibility to obtain such bottom closures as are known in connection with cross bottoms, block bottoms or the like.

The invention furthermore provides that the movable welding element is not in the form of an active welding element. The non-active welding element then serves merely as a pressure bar in carrying out the welding operations. Such an arrangement has proven to be particularly advantageous either where the wall thickness of the part to be welded is relatively thin or where the wall thickness of the foils to be connected is an uneven wall thickness. In order to make it possible to provide the ends of a tubing section or merely one end of the section with a lap seam, the apparatus in accordance with the invention is so arranged that a supply roll is provided for the plastic strip to be additionally supplied, which is fed through a stationary folding device to the tubing section, and furthermore a cutting device is provided for the plastic strip supplied through this device.

BRIEF DESCRIPTION OF THE DRAWINGS

Further objects and advantages of the invention will become apparent from the following specification with reference to the appended drawings in which:

FIG. 7 illustrates the manner of guiding the material for forming the lap seam,

FIG. 8 is a section of the bag provided with the strip of foil similar to FIG. 4, FIG. 9 is a side view of the bag shown in FIG. 8, FIG. 10 shows a partial section of the arrangement of additional welding elements on the drum, FIG. 11 illustrates the mounting of the control elements on a special disk in a manner differing from FIG. 2, FIG. 12 shows the manner of guiding the work blanks between the upper band and the lower band on the drum circumference, and FIGS. 13 and 14 are diagrams of the circuits for the control elements of the welding bars.

DESCRIPTION OF PREFERRED EMBODIMENTS OF THE INVENTION

Figure 1:
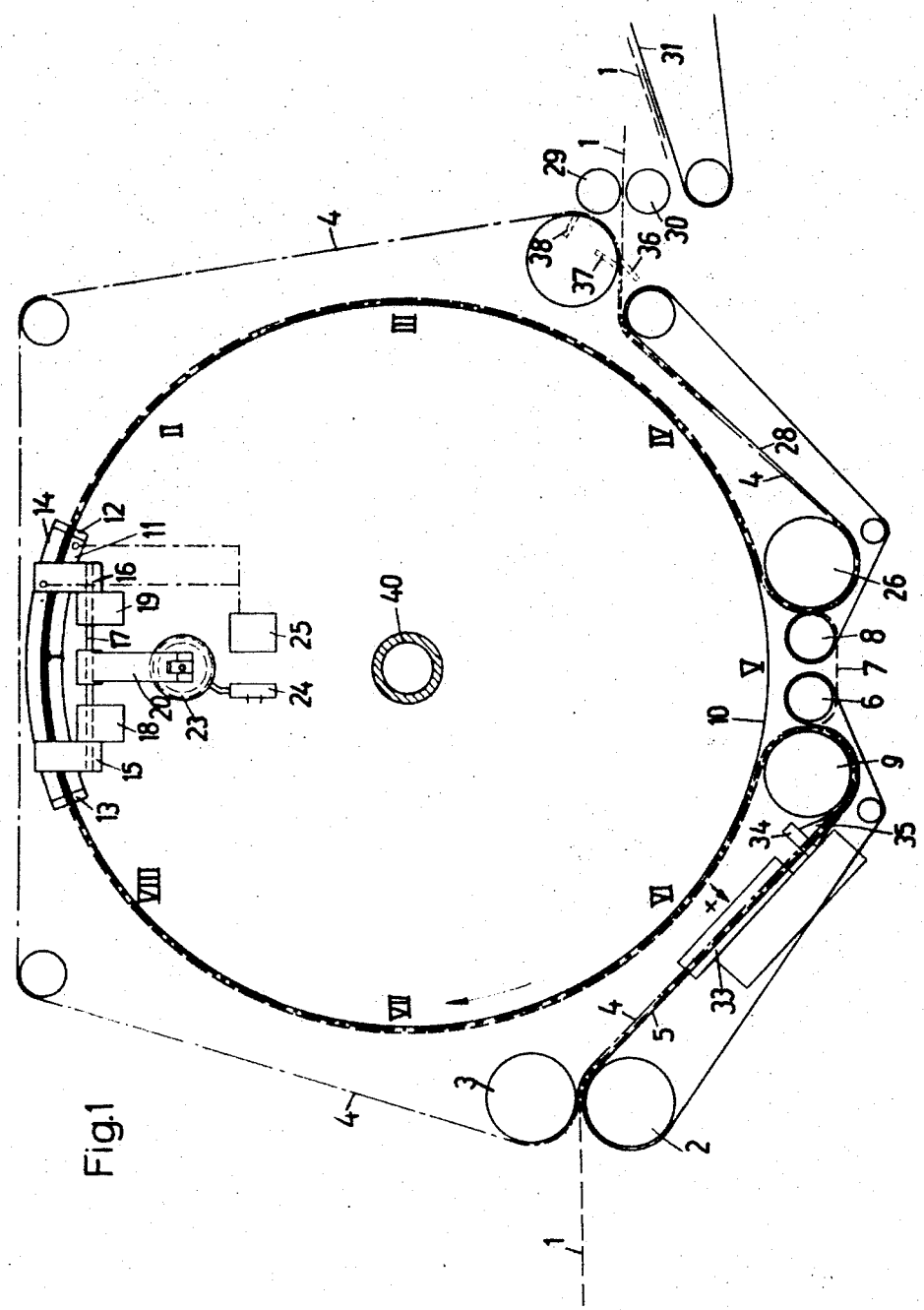
FIG. 1 is a front view illustrating the welding apparatus schematically.
Figure 2:
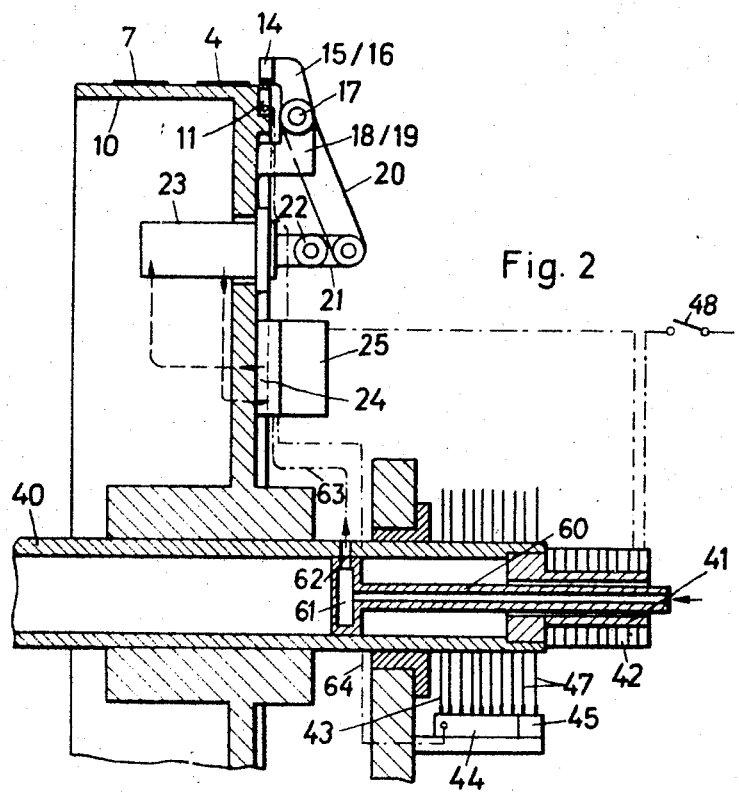
FIG. 2 is a partial sectional view of the welding drum.

The workpiece or blank is fed to the welding machine in accordance with FIG. 1 from the left; it consists of a plastic tubing section which is introduced in transverse position between the feed rollers 2 and 3. The upper drum band 4 is conducted around the roller 3 and a base band 5 moves around roller 2 whence it is guided around roller 6 to return to roller 2. A drum base band 7 runs around the drum or cylinder 10 which is likewise guided around roller 6 and also around guiding roller 8. The work blank is conducted by the band transport defined between bands 4 and 5 by way of an input guiding roller 9 onto the work cylinder 10 of the welding drum. As shown in FIG. 12, the base band 7 is arranged alongside of the upper band 4. The work blank 1 assumes the position indicated on the drum 10. It will be seen that it is held between the upper band 4 and the drum 10. The base band 7 serves merely for guiding or transferring the blank 1 from the roller 9 to the drum 10 and then to deliver it by way of cylinder 26 from drum 10 to the bands 4 and 28 as explained below. In FIG. 2 of the drawing the bands 4 and 7 are shown concentrically disposed on the drum 10 for the sake of clearness. Actually they are arranged alongside one another as shown in FIG. 12 and not on top of one another. The work cylinder 10 has eight operating stations which are identified by numerals I to VIII. Only station I of these operating stations is illustrated in FIG. 1.

The support combined with a welding bar 11 is threadedly secured to the work cylinder 10 with the insulated head pieces 12 and 13. A support combined with a welding bar 14 presses against the ewlding bar support 11. This bar support 14 is secured to levers 15 and 16 which are threadedly secured to shaft 17, which in turn is journalled to the bearing blocks 18 and 19. The welding bars mentioned above contain suitable heating elements or welding hands bands (53 in FIG. 13). Welding bands 53 are connected to transformer 25. A lever 20 is secured to shaft 17, which lever is connected by way of an eye bar 21 to the piston rod 22 of a compressed air cylinder 23. The compressed air cylinder is threadedly secured to the front wall of the welding drum of the operating cylinder 10. The working cylinder carries in addition an electromagnetic compressed air valve 24 and the welding transformer 25 for the welding strips of the welding bars. The control during the welding operation and the operation of the valves is explained further hereinbelow.

After performance of the welding operation the work piece is removed by the redirecting cylinder 26. The workpiece is then guided to be discharged by the two bands 4 and 28. The discharge rollers 29, 30 feed the blank to the discharge band 31.

Figures 3, 4:
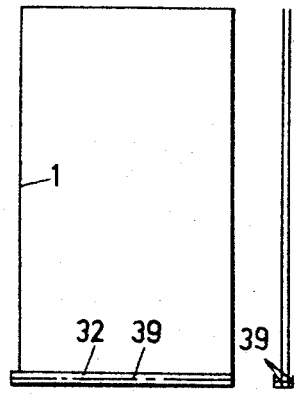
FIG. 3 shows a welded bag having a lap seam.
FIG. 4 is a longitudinal section of the bag in accordance with FIG. 3.
Figures 5, 6:
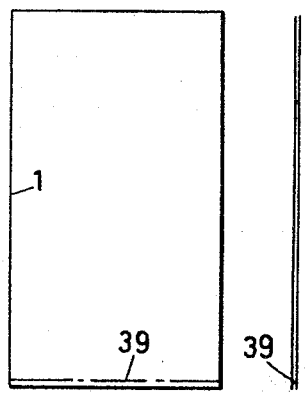
FIG. 5 shows a welded bag having a shrunk or impulse seam.
FIG. 6 is a longitudinal section of the bag in FIG. 5.

If the workpiece or blank, i.e. the transversely fed plastic tubing section is provided with a lap seam as illustrated in FIGS. 3 and 4, (see also FIGS. 8 and 9) then the feeding of an additional strip of foil 32 is effected by means of supply roll 33, guide roller 34 and guide member 35 as shown in FIG. 7. This guide member 35 is fixedly mounted and serves for folding the additional strips of foil into a folded strip which may be U- or V-shaped in cross section.

The components 33, 34 and 35 which are only schematically indicated in FIG. 1 are shown in a plan view in FIG. 7, which is taken generally radially from the drum as indicated by the arrow $x$ in FIG. 1. The foil strip 32 which is not indicated in FIG. 1 runs from the roll 33 first flatly about the guide roller 34 to the guide element 35, where it is joined with the blank 1. The guide element is of the general form of a funnel which is open along one side and has a longitudinal slot into which extends one end of the flattened tubular work blank 1 which is to be closed and to which the strip of foil 32 is to be applied. The foil strip 32 is folded in U-shape or V-shape fashion in the guide element 35 about the edge of this end of the blank. In this condition the work blank is then fed together with the strip 32 that covers its end to the welding station, where it is welded together with the strip.

After the welding operation has been completed the projecting parts of the strip are severed by means of the stationary cutter 36 and rotating cutters 37, 38. These cutters are of the conventional construction for cutters of paper treating machines. The sationary cutter 36 constitutes a straight rail, while the cutters 37 and 38 which are also rail-like are mounted upon a rotating roller parallel to the axis thereof. The welded seams proper are indicated at 39. The compressed air is supplied through the hollow shaft 40 of the work cylinder or drum 10 with the aid of an automatic stuffing sleeve 41. Shaft 40 serves at the same time for mounting the slide rings 42 to supply the electric current and the control segments for the cam switches 44.

The compressed air cylinder 23 is mounted on the drum 10 with which it rotates on the shaft 40. A compressed air tube 60 extends through sleeve 41 into the tube where it ends in a hollow piston 61. The piston tightly fits the cylindrical inner wall of the hollow shaft 40 and is connected by apertures 62 with air conduits 63 of the magnetic valve 24 which controls the compressed air cylinder 23. The electric control leads 64 of the magnetic valve 24 are connected to the contacts of cam switches 44, the operation or actuation of which depends on the rotation of the drum, and which establish the time relationship of the switching and working operations to be performed and of the existing positions of the work blanks with respect to the welding stations.

The circuit diagram 13 illustrates the basic circuit of the welding transformer 25 whose primary winding is supplied with current by leads R and S through fuses 51, the switch 48 and slip rings 42. The heating elements or the welding strips 53 are connected to the secondary winding of transformer 25.

The circuit diagram 14 shows the electrical connections between the cam switches 44 and 45 and the control circuits of two relays 48, 49 and of a time relay 50. 48 is an auxiliary relay for connecting and disconnecting the welding transformer 25 by means of the contacts shown in FIG. 13, and 49 an auxiliary relay which controls primarily the magnetic air valve 24, while 50 is a time relay that controls the relay 48 and thus the work period of the welding transformer 25.

The welding operation is controlled in the following manner:

Each operating station I to VIII has a control segment 43 asociated therewith which is mounted on shaft 40 (FIG. 2). The control segments 43 actuate the cam switches 44 (FIG. 14). As one of the switches 44 is closed an auxiliary switch 49 is closed and operates the magnetic valve 24 for operating the welding bar support 14. This causes the working cylinder 23 to operate and actuate levers 21 and 20 so that the welding bar carrier 14 passes the work blank against the welding bar carrier 11. At least one other control segment 47 is mounted on the shaft 40 for operating a cam switch 45. If the cam switch 45 is closed an impulse is supplied to an electronic time relay 50. As a result the circuit to the transformer 25 is closed, the primary of which is supplied with a potential from the slide rings 42 while the secondary thereof furnishes its potential to the welding band 53 (FIG. 13). Upon expiration of the predetermined period of time at the time relay 50 the safety switch 48 is opened so that no current is supplied to the transformer and the heating period of the welding band 53 is ended. At the same time the auxiliary switch 49 is released which causes the magnetic valve 24 to return to the starting position, thereby actuating the operating cylinder 23 to move in opposite direction. As a result the welding bar carrier 14 is raised from the work blank.

The welding method described above is used for the production of shrunk seams. If it is desired to produce an impulse seam, then one selector switch 46 is moved to switch position I. With this position of the switch the magnetic valve 24 is no longer under the control of the time relay 50 but the control is now taken over by control segment 43.

Since with the aforementioned control arrangement the welding bar support or carrier 14 presses against the work blank for a longer time period than the actual welding time the welding seam has time to cool off before the pressure of the welding bar 14 ceases.

By using eight operating stations on the drum it would be necessary in the normal case to proportion the switching or control period of the time relay 50 smaller than what corresponds to the angular period of 45°. To make it possible to increase the welding period for heavier materials, a further development in accordance with the invention provides for two control segments 47 to operate two switches 45. In this connection the cams are angularly displaced with respect to one another in a manner that one segment disk initiates the welding operations for operating stations I, III, V, VII while the other control segment disk actuates the even numbered operating stations. This makes it possible to extend the welding time of one operating station to a period corresponding to approximately 90°. Consequently two successive welding stations are then simultaneously connected over a certain angular range.

As mentioned above it is possible to provide besides the arcuate welding elements 12, 14, additional welding elements which are disposed parallel to the axis of the drum 10. Such an elongated element is shown at 57 in FIG. 10 in operative relationship with the associated pressure cylinder by means of which the element 57 is pressed against the work blank.

FIG. 11 shows the arrangement of the control elements upon a separate carrier disk which rotates with the welding drum 10. While these control elements are provided directly on the cylinder in the embodiment of FIG. 2, they are carried externally by the disk 56 in the arrangement in accordance with FIG. 11.

Having now described my invention and its method of operation with reference to the embodiments illustrated in the drawings, I do not wish to be limited thereto, but what I desire to protect by Letters Patent of the United States is set forth in the appended claims.

I claim:

1. Apparatus for welding at least one end of blanks made of tube sections of plastic material to produce plastic bags and the like comprising a rotatable drum, a plurality of welding stations arranged circumferentially of said drum, support means provided at each welding station including a movable member operative to secure a blank in transverse position on said drum, and a circumferentially extending welding strip arranged on said drum with each said support means, said apparatus further including a pair of continuous retaining bands for said blanks including an upper band and a lower band extending around said drum and movable therewith.

2. Apparatus in accordance with claim 1, including control means for said movable support member, said movable member and said control means being mounted for support on said drum.

3. Apparatus in accordance with claim 2, wherein said control means for each station comprises a piston and cylinder arrangement controlled by a magnetically operated valve operatively linked to said movable support member.

4. Apparatus in accordance with claim 1, comprising a guiding roller for said bands proximate the entrance end of the blanks to the drum, means for feeding a continuous plastic strip to the blanks being fed to the apparatus including a roll of plastic strip material, a stationary folding device disposed proximate said guiding roller and cutting means for said plastic strip.

5. Apparatus in accordance with claim 3, comprising a shaft on which said drum is mounted, a plurality of control segments and a cam switch for actuating the magnetically operated valves.

6. Apparatus in accordance with claim 5, comprising a welding transformer, a time relay controlled by said cam switch operative to complete the circuit for said welding transformer.

7. Apparatus in accordance withe claim 6, including said control segments, a selector switch operative to connect and disconnect said time relay and to connect said transformer and operate said magnetic valve.

8. Apparatus in accordance with claim 1, comprising a carrier disk rotatable with said drum and control means for said movable members mounted on said carrier disk.

9. Apparatus in accordance with claim 8, where additional welding elements are provided circumferentially of said drum, said additional elements being disposed parallel to the axis of said drum in a manner known per se.

10. Apparatus in accordance with claim 7, including two control segments and two time relays at each alternate station thereby achieving overlapping welding periods.

11. Apparatus for welding at least one end of blanks made of tube sections of plastic material to produce plastic bags and the like comprising a rotatable drum, a plurality of welding stations disposed circumferentially of said drum, support means adapted to retain blanks in spaced relation to each other transversely of said drum, a welding strip disposed with its longitudinal extent along a circumferential sector of said drum at each said welding station operative to provide a welding seam transversely of the blanks and circumferentially of said drum.

12. Apparatus in accordance with claim 11, comprising two cooperating elements at each welding station, one being a stationary member on said drum provided with a heating element and the other being an unheated pressure bar radially movable relative to said stationary member.

References Cited

UNITED STATES PATENTS

| 2,680,471 | 6/1954 | Mercer | 156—583 |
| 3,192,095 | 6/1965 | Doyen et al. | 156—583 |

DOUGLAS J. DRUMMOND, Primary Examiner

U.S. Cl. X.R.

156—522, 583